United States Patent
Wooten

Patent Number: 5,644,755
Date of Patent: Jul. 1, 1997

[54] PROCESSOR WITH VIRTUAL SYSTEM MODE

[75] Inventor: David R. Wooten, Spring, Tex.

[73] Assignee: Compaq Computer Corporation, Houston, Tex.

[21] Appl. No.: 394,680

[22] Filed: Feb. 24, 1995

[51] Int. Cl.$^6$ .................................................. G06F 12/10
[52] U.S. Cl. ................................................................ 395/500
[58] Field of Search ....................................... 395/500, 800, 395/375, 650, 775, 700, 405

[56] References Cited

U.S. PATENT DOCUMENTS

| | | | |
|---|---|---|---|
| 5,274,791 | 12/1993 | Bracking et al. | 395/405 |
| 5,303,378 | 4/1994 | Cohen | 395/700 |
| 5,355,490 | 10/1994 | Kou | 395/700 |
| 5,517,651 | 5/1996 | Huck et al. | 395/775 |
| 5,517,657 | 5/1996 | Rodgers et al. | 395/800 |

OTHER PUBLICATIONS

Reaching Physical Board Addresses in a PC From Windows Protected Mode David Huffman, IEEE Mar. 1995.
Intel486™ SL Microprocessor SuperSet System Design Guide, Nov., 1992 (Chapters 1–4 and 12).
Intel486™ SL Microprocessor SuperSet Programmer's Reference Manual, Nov., 1992 (Chapters 1–4 and 6).
Pentium™ Processor User's Manual vol. 3: Architecture and Programming Manual by Intel®, 1993, (Chapters 1–4, 9–15, 20 and 22).

*Primary Examiner*—Kevin J. Teska
*Assistant Examiner*—Dan Fiul
*Attorney, Agent, or Firm*—Pravel, Hewitt, Kimball & Krieger

[57] ABSTRACT

A processor having the prior three user addressing modes and a new virtual system mode (VSM). The user modes include real mode, protected mode and virtual 8086 mode. In VSM, the processor can utilize the VSM addressing mechanism and the mode of operation prior to entering VSM. Transitions from the user modes to virtual system mode can be made by indirect calls through a call gate or through vectored entries. While in VSM the processor can utilize VSM memory and I/O space modes, but can also directly utilize the I/O space and memory of the user mode present prior to entry into VSM by using a segment override. The upper 16MB of the virtual system mode memory space (0xff000000 through 0xffffffff) is designated as non-mapped virtual system mode memory. Virtual system mode logical addresses below 0xff000000 will be translated to physical addresses by the current page table if paging is enabled (protected mode). Upon exiting VSM, any processor registers that were saved are restored so the user mode operation can continue as if the emulation operation were performed by the normal interrupt service routine.

86 Claims, 8 Drawing Sheets

GENERAL PURPOSE REGISTERS

| | 31    15   8 7   0 | 16-BIT | 32-BIT |
|---|---|---|---|
| 200 ACCUMULATOR | AH \| AL | HX | EAX |
| 202 BASE | BH \| BL | BX | EBX |
| 204 COUNT | CH \| CL | CX | ECX |
| 206 DATA | DH \| DL | DX | EDX |
| 208 BASE POINTER | BP | | EBP |
| 210 SOURCE INDEX | SI | | ESI |
| 212 DESTINATION INDEX | DI | | EDI |
| 214 STACK POINTER | SP | | ESP |

*FIG. 2A*

SEGMENT REGISTERS

| | 15    0 |
|---|---|
| 220 CODE | CS |
| 222 STACK | SS |
| 224 DATA | DS |
| 226 { EXTRA DATA | ES |
| EXTRA DATA | FS |
| EXTRA DATA | GS |

INSTRUCTION POINTER REGISTER

| 31    15    0 | 32-BIT |
|---|---|
| 232    IP | EIP |

*FIG. 2B*

PROCESSOR WITH VIRTUAL SYSTEM MODE

FIELD OF THE INVENTION

This invention relates to a processor and more specifically to a processor having a mode of operation for emulating standard PC hardware transparently to the operating system, with this mode of operation allowing segment registers to operate according to different addressing modes at the same time.

BACKGROUND OF THE INVENTION

The x86 family of personal computers is well established in the marketplace. Computer manufacturers strive to design the highest performing systems at the lowest cost. However, often the highest performing or lowest cost parts from which a computer can be built are not PC-compatible. If a computer is not PC compatible, the sales market for the computer is severely diminished, thus PC-compatibility is very desirable. Currently, PC systems designers are limited in their ability to build systems that do not conform to PC hardware standards. The reason for the limitation is that much of the existing software that runs on PC's makes explicit assumptions about the nature of the hardware. If the hardware provided by the systems designer does not conform to those standards, many software programs will not be usable. This limits the systems designer's ability to reduce costs and improve functionality.

Currently, the most common means of running the software on a non-compatible machine is to use a software program that does complete emulation of a PC. The emulation is performed on each instruction. This method is practical only for machines that are not binary compatible with x86 PC's because performance is poor.

One prior approach to using non-standard hardware devices provided hardware circuitry to trap and store each bus access to a standard PC device and then cause the execution of an interrupt. The invoked interrupt handler then determined the accessed address from the hardware circuitry, converted this to the proper device address and executed that operation. This technique worked adequately when the processor and system were relatively simple and only for certain operating systems. However, it is not practical on current computer systems because of increased complexity of the processor, system and operating systems and the frequent unavailability of an interrupt.

This interrupt problem could be solved by the use of System Management Mode (SMM) found in certain processors, such as the Intel 486SL, 486 S-class and Pentium microprocessors. The SMI interrupt cannot be masked by software and therefore is always available to the system manufacturer. However, there are several disadvantages to the current SMM implementations for doing hardware emulation. The first is that entry to and exit from SMM requires many processor cycles. This is because SMM implementations were done with the assumption that the only thing that would be done in SMM is power management. This assumption caused the SMM implementor to design the processors so that the full state of the processor was saved on entry to SMM and the full state of the processor was restored on exit from SMM. These operations require 100's of processor cycles. This entry/exit overhead of current SMM implementations greatly limits it's usefulness for emulation.

A second disadvantage is that while in SMM access to user memory is limited and/or cumbersome because of the different modes of operation and their corresponding addressing mechanisms. In this context, user memory is memory that is used by programs when the processor is operating in one of its operating modes. In the 386 family of microprocessor, three different operating modes exist in addition to SMM. Real mode is the default mode of operation for the microprocessor and is provided for backwards compatibility with the earlier 8086 and 8088 processors. Protected mode was first introduced in the 80286 microprocessor and improved in the 386 microprocessor. Protected mode removes most of the memory management limitations of the earlier processors. The preferred mode of operation for the 386 processor is its protected mode. Once the processor is in protected mode, an additional real mode environment, called virtual 8086 mode, can be created for backward compatibility with real mode applications. Memory management in the processor is performed by a segmentation unit and a paging unit. Real mode utilizes a 16-bit selector, shifted left four bits, and a 16-bit offset to produce a 20-bit address for addressing up to 1MB of memory. The 16-bit offset limits the segment to a maximum of 64k of memory. In protected mode the segment register is redefined as a selector which points to a 32-bit segment base address and the offset is increased to 32 bits, with the segment base address and the offset simply being added to provide the linear address. Protected mode may enjoy a 4GB maximum memory segment. If paging is enabled, the linear address is then translated by the paging unit into a physical address. Paging is a mechanism to support a large physical address space in memory using a small amount of memory and some hard disk space. Virtual 8086 mode addressing is similar to real mode in that the same 16-bit selector and offset are used, however, it is different from real mode in that the 1MB address range can be placed anywhere within the 32-bit protected mode addressing range. Thus, three different addressing schemes may exist in a computer system using a 386 compatible processor. When the processor switches to system management mode, a fourth hybrid addressing mechanism is utilized. SMM generally uses a 32-bit flat memory model addressing scheme. Segment register values are stilled shifted 4 bits and added to the offset values, but both can be 32 bit values.

In a 386 compatible processor, addressing mechanisms cannot be mixed between different modes of operation. For example, when the processor is operating in 32-bit protected mode and then switches to 16-bit real mode, no protected mode addressing selectors or offsets can be directly used. To access a protected mode address space with a real mode addressing mechanism, the entire protected mode addressing mechanism including selectors, offsets, and paging must be calculated. Such is the case between any two addressing modes. This limitation complicates device emulation when using SMM because the SMM code must devote significant amounts of time in an address translation process which converts the address used by the user program into an address that SMM can use to access the same memory location. This process is complicated by the fact that the x86 architecture supports several different addressing modes so that the SMM code must analyze the operational mode of the user program and select an address conversion algorithm that is appropriate to that mode. So this addressing mode change in SMM further exacerbates the overhead problems, so that use of the SMI is not readily feasible.

Thus, it is desirable to have a processor that can provide emulation transparently to the operating system and application software while using the built-in memory management features but using very few processor cycles to enter and exit the emulation operations and not having large address translation burdens.

SUMMARY OF THE INVENTION

A processor embodying the principles of the present invention includes a processor having the prior three user addressing modes and a new virtual system mode (VSM). The processor is preferably compatible with Intel 486 or higher processors, and therefore in this context, the user modes refer to normal operational modes of the processor, including real mode, protected mode and virtual 8086 mode.

Virtual System mode (VSM) refers to the features provided by the present invention. In VSM, the processor can utilize the VSM addressing mechanism and one other, that being the addressing mechanism of the mode of operation prior to entering VSM.

Transitions from the user modes to virtual system mode can be made by indirect calls through a call gate, such as by a jump or call instruction, or through vectored entries, such as a hardware interrupt or I/O fault. When transitioning from the user modes to virtual system mode, the processor treats the transition similar to a task switch, thus saving only certain minimal processor registers depending on the VSM entry cause. The remaining processor registers are not disturbed, thereby providing low overhead for entry and exit from virtual system mode.

While in the user modes, user mode addressing mechanisms remain unchanged. While in virtual system mode, the processor can utilize VSM memory and I/O space modes, but can also directly utilize the I/O space and memory of the user mode present prior to entry into VSM. If in VSM and a segment override is applied, the segment override register is interpreted according to the addressing mechanism of the mode of operation prior to entering VSM.

While in virtual system mode, memory addresses may be paged or non-paged depending on the user mode from which virtual system mode was called. Virtual system mode code executes in a 32-bit logical space. The default data size is 32-bits, but overrides may be used. The upper 16MB of the virtual system mode memory space (0xff000000 through 0xffffffff) is designated as non-mapped virtual system mode memory. Virtual system mode logical addresses in this range are directly converted to an addressable range of the processor. Virtual system mode logical addresses below 0xff000000 will be translated to physical addresses by the current page table if paging is enabled (protected mode). Otherwise, these addresses become physical addresses without modification (real mode).

VSM may be exited by one of three instructions. Upon exiting, any processor registers that were saved are restored so the user mode operation can continue as if the emulation operation were performed by its own interrupt service routine.

BRIEF DESCRIPTION OF THE DRAWINGS

A better understanding of the present invention can be obtained when the following detailed description of the preferred embodiment is considered in conjunction with the following drawings, in which:

FIG. 2A illustrates the general purpose registers of the processor.

FIG. 2B illustrates the segment registers and instruction pointer register of the processor.

DETAILED DESCRIPTION OF THE PREFERRED EMBODIMENT

The processor of the present invention is preferably based on an Intel compatible 486 or Pentium class microprocessor, however the invention could also be used with an Intel 386 class microprocessor. The use of the features described herein could also be used with other types of microprocessors. For purposes here, the terms microprocessor and processor can be used interchangeably. The new mode defined according to the present invention is in addition to the existing modes of the 486 and Pentium processors, and unless otherwise indicated, the operation and features of the processors remain unchanged. Familiarity with the operation of the 486 and Pentium are assumed in this description. For any details, reference should be made to the appropriate data book.

Figure 1A:
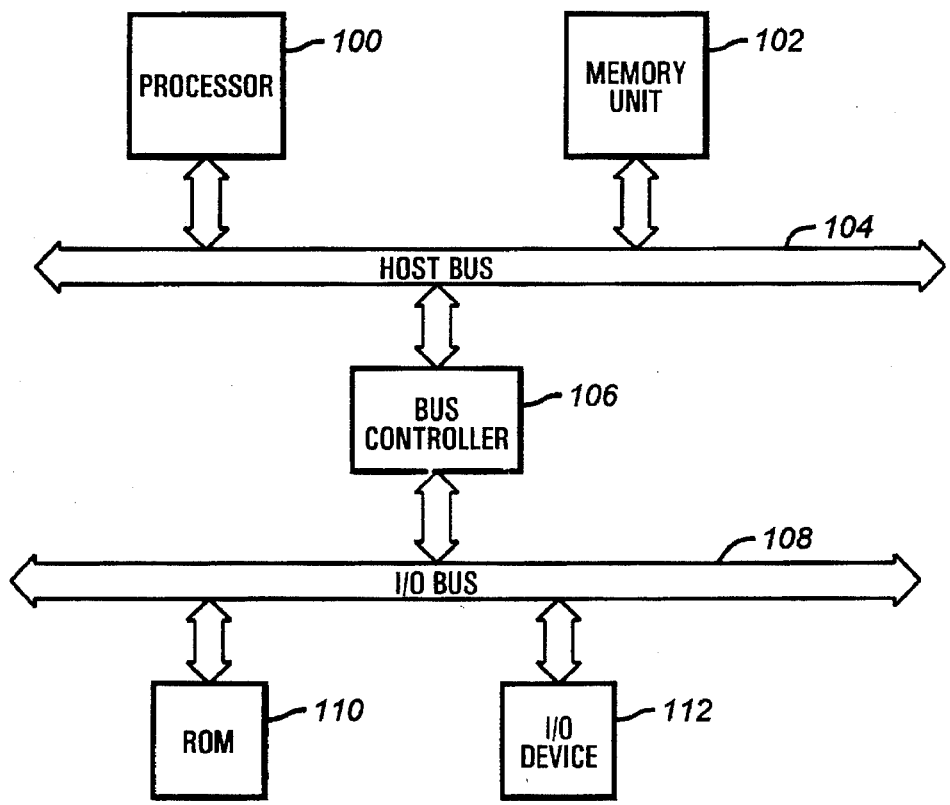
FIG. 1A is a block diagram illustrating a computer system C containing a processor according to the present invention.

The processor of the present invention is designed to be used in a IBM compatible computer. FIG. 1A is a block diagram of the processor P in an exemplary computer system C. The processor P is connected to a memory unit 102 and a bus controller 106 by a host bus 104. Processor P provides the data, address and control signals to the host bus 104 for communicating with external circuits, and likewise receives data on the host bus 104 from the external circuits. One of such external circuits is the memory unit 102. Memory unit 102 provides conventional memory storage for programs and data of the computer system C. The bus controller 106 is connected by an I/O bus 108 to a ROM 110 and several I/O devices 112, such as a keyboard, floppy disk, hard disk, serial port, parallel port, and monitor. The items referred to herein but not explicitly shown on the figures are offered for illustrative purposes and are not generally important to the enablement of the present invention since the PC architecture is well known to those of ordinary skill in the art. Additionally, the processor of the present invention could be used in a wide variety of computer systems.

Figure 1B:
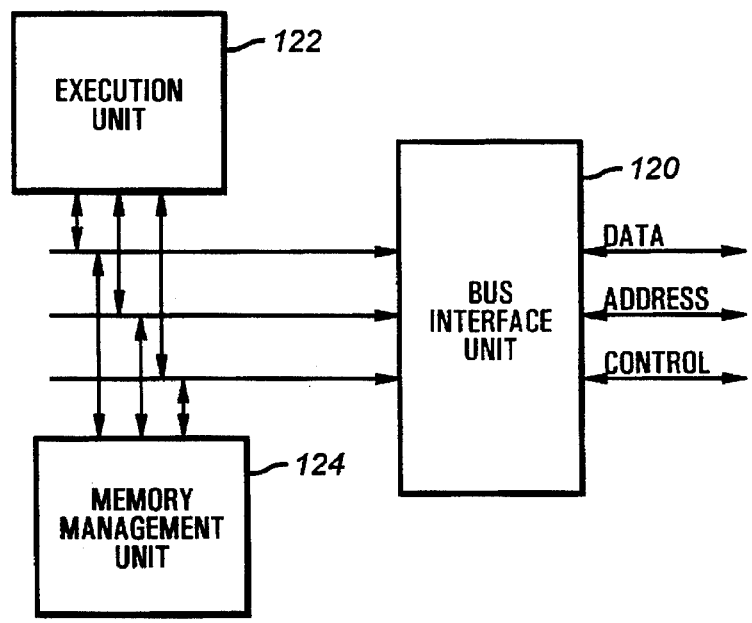
FIG. 1B is a block diagram of the processor.

FIG. 1B illustrates the major portions of processor P. The processor P has a bus interface unit 120 connected to an execution unit 122 and a memory management unit 124. Bus interface unit 120 provides data, address and control signals for communicating with external circuits. Execution unit 122 contains logic necessary for executing instructions, including an instruction prefetch and predecode unit, a control unit for decoding and sequencing of instructions, and an arithmetic logic unit containing a set of registers for executing each individual instruction. The execution unit 122 works in conjunction with and is connected to the memory management unit 124. The memory management unit 124 contains the logic necessary for address generation and protection checking and includes a segmentation unit and a paging unit. These functions will be described in more detail below.

The bus controller 106 translates the processor P cycles into I/O bus 108 cycles for providing communication between the processor P and the I/O devices 112. In the preferred embodiment of the computer system C, the I/O devices 112 may not be PC-compatible. Compatibility is important because in the PC, software generally expects certain registers and bits to be present in most I/O devices. If a device is designed into a computer that is not compatible, the software would not be able to communicate directly with the device, therefore the computer would not operate properly. A processor embodying the present invention would handle non-compatible device by having a facility for: interrupting the processor when software tries to access the known non-PC-compatible device; and processing the operation transparently to the software so that the software believes the device is PC compatible. The feature that provides these benefits is hereinafter known as virtual system mode (VSM).

The processor P has four modes of operation, namely, real mode, protected mode, virtual 8086 mode and virtual system mode. In this context, real mode, protected mode and virtual 8086 mode are referred to as user modes. Those having ordinary skill in the art will recognize that the user modes refer to the modes of operation for executing conventional software such as the operating system and applications software. A complete description of real mode, protected mode and virtual 8086 mode can be found in the Intel 486 microprocessor databook. Briefly, the purpose of real mode operation is for backward compatibility with the earlier 16-bit, 8086 processor. Additionally, real mode is the default mode of the processor and is required to setup the processor for protected mode operation. Real mode and virtual 8086 mode are limited to accessing only 1MByte of physical memory and are thus not the preferred mode of operation. Protected mode provides access to the memory management capabilities of paging and protection, discussed below, and operates in a 32-bit environment with 4GByte physical memory limit and therefore, in conjunction with virtual system mode, is the preferred mode of operation of the processor. Within protected mode, software can perform a task switch to enter into tasks known as virtual 8086 mode tasks thus emulating real mode as a task from within the protected mode of operation.

Virtual system mode (VSM) provides an additional mode of operation from which a VSM emulation task can be performed transparently to the conventional software executing on the computer system. A better understanding of VSM can be obtained from the following detailed description.

REGISTERS

The processor P contains eight general purpose registers which are used for both address calculation and data operations and can support data operands of 1, 8, 16 and 32 bits. FIG. 2A illustrates the general purpose registers of the processor P. The eight registers are: the accumulator register (AX) 200, the base register (BX) 202, the count register (CX) 204, the data register (DX) 206, the base pointer register (BP) 208, the source index register (SI) 210, the destination index register (DI) 212, and the stack pointer register (SP) 214. Those having ordinary skill in the art will recognize the terms in parenthesis as the commonly used names for the 16-bit form of the registers. The 32-bit form of the general purpose registers are named EAX, EBX, ECX, EDX, ESI, EDI, EBP and ESP respectively. The least significant 16-bits of the 32-bit general purpose registers can be accessed separately by using the 16-bit names of the registers AX, BX, CX, DX, SI, DI, BP and SP as described above.

Turning now to FIG. 2B, six 16-bit segment registers and the instruction pointer are shown. The six 16-bit segment registers are used for segmentation, discussed below, and are named the code segment register (CS) 220, the stack segment register (SS) 222, the data segment register (DS) and the extra data segment registers (ES, FS and GS) 226. The commonly used names are the CS, SS, DS, ES, FS and GS segment registers. The 16-bit segment registers hold values, called selectors, identifying the currently addressable memory segment. A segment is simply a section of memory whose boundaries can be described by a base address and an offset from the base address. The selector in CS indicates the current code segment, the selector in SS indicates the current stack segment while the selectors in DS, ES, FS and GS indicate the current data segments.

The instruction pointer 232 holds the offset of the next instruction to be executed. The 32-bit instruction pointer 232 is commonly referred to as the EIP register and the 16-bit instruction pointer 232 is named the IP register. The offset contained in the instruction pointer 232 is always relative to the base of the code segment, thus the logical address for the next instruction address is calculated by adding the offset to the code segment base address.

Figure 2C:
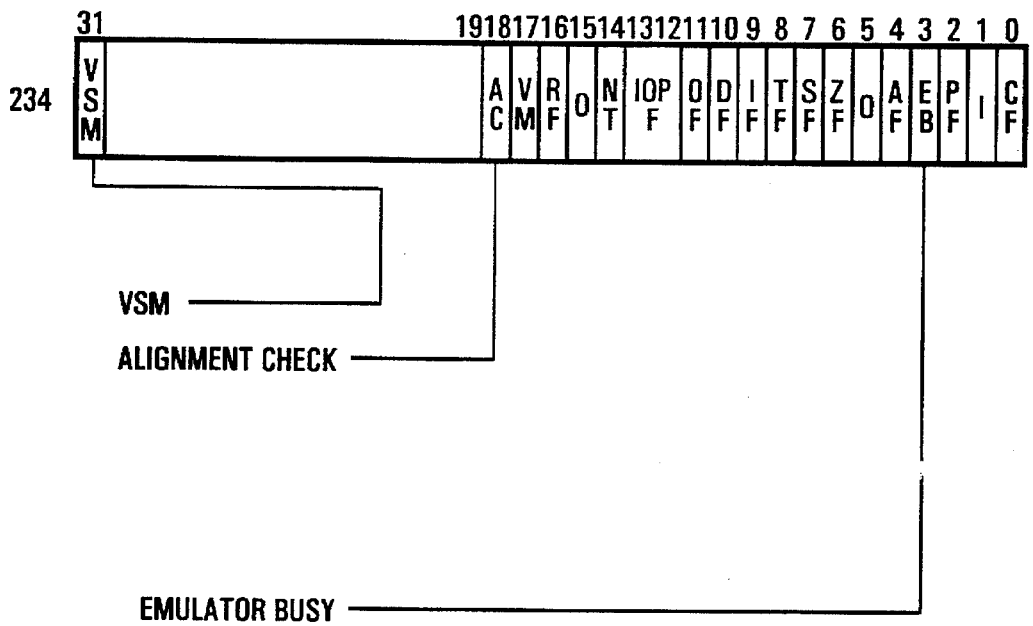
FIG. 2C illustrates the flags register of the processor.

Referring now to FIG. 2C, the flags register 234 of the processor P is shown. The flags register 234 contains a 32-bit value named EFLAGS, while the lower 16-bits of flags register 234 contain the 16-bit value named FLAGS. The 16-bit portion is used when executing 8086 and 80286 code. Bit 17 is defined as the virtual 8086 mode (VM) flag and is set by the processor P if virtual 8086 mode is the current operating mode. Bit 3 is defined as the emulator busy (EB) flag and is set when, in virtual system mode, an exception is taken causing VSM to again be entered, and is cleared when the exception routine is exited. When set, and the next instruction executed causes an exception that enters VSM, the pushed EFLAGS/FLAGS image will have the EB flag sets. If the instruction does not cause a fault or exception, then a deferred interrupt fault is generated. Bit 31 is defined as the Virtual System Mode (VSM) flag and is set when virtual system mode is entered and cleared when virtual system mode is exited by an IRET instruction or the flags register 234 is loaded without the VSM flag set. The VSM flag cannot be set with a Pop Stack into Flags (POPF) instruction or an Interrupt Return (IRET) instruction. It may be set by a task switch if VSM is enabled. All defined flags of the flags register 234, with the exception of the EB flag and VSM flag, are used by the user modes. When in virtual system mode, instructions are additionally responsive to the EB flag and VSM flag so that if VSM code is running and an additional exception is again taken to VSM code, upon return from the subsequent exception, processing will return to the original VSM routine instead of exiting VSM code completely.

Figure 2D:
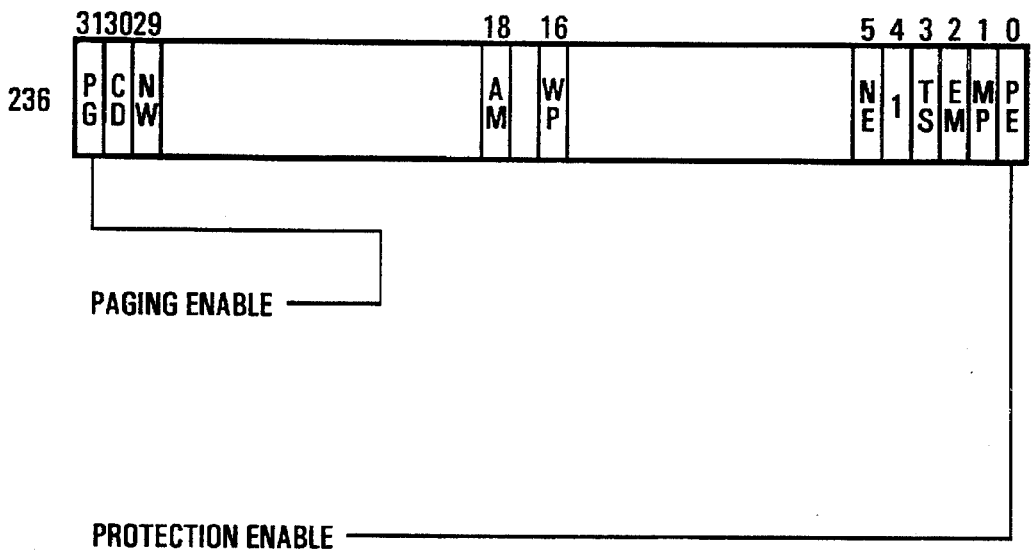
FIG. 2D illustrates the Control Register 0 of the processor.

Referring now to FIG. 2D, Control Register 0 (CR0) 236 of the processor P is shown. CR0 contains 6 bits for control and status purposes including the Paging Enable (PG) bit and the Protection Enable (PE) bit. Those skilled in the art will recognize that these bits help define the user modes of operation in the processor P, and are accessed by load and store instructions. If the PG bit and the PE bit are cleared, the processor P is operating in real mode. If the PG bit is cleared and the PE bit is set, the processor P is operating in protected mode. If the PG bit and the PE bit are set, the processor P is operating in paged protected mode. When the PG bit is set and the PE bit is cleared, the processor state is undefined and loading this combination will cause an exception. However, if this is attempted while operating in virtual system mode, loading this combination will not raise an exception but will enable paging, thus having the effect of enabling paging for a real mode application. If the PE-bit is set and the VM-bit is set, the processor is operating in virtual 8086 mode. Virtual system mode selection is controlled by a bit in the VSM Enable register 238, discussed below, and is independent of the user mode and therefore does not affect the use of the PG, PE or VM bits.

Figure 2E:
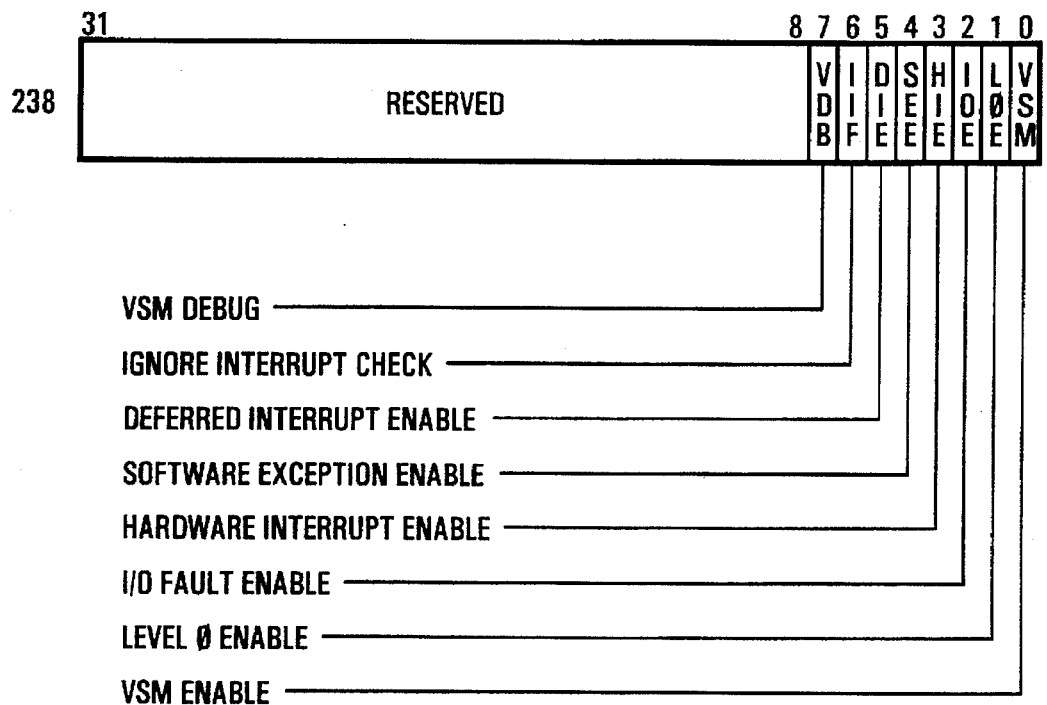
FIG. 2E illustrates the VSM enable register of the processor.
Figure 2F:
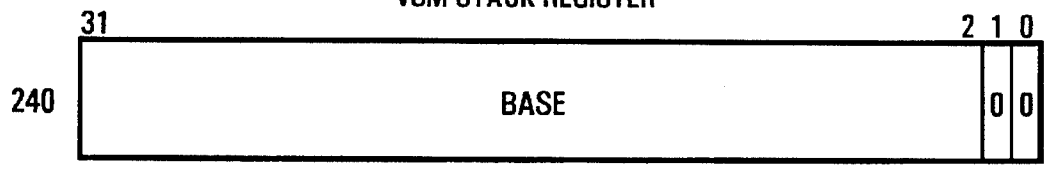
FIG. 2F illustrates the VSM stack register and VSM Vector Base register of the processor.
Figure 2F:
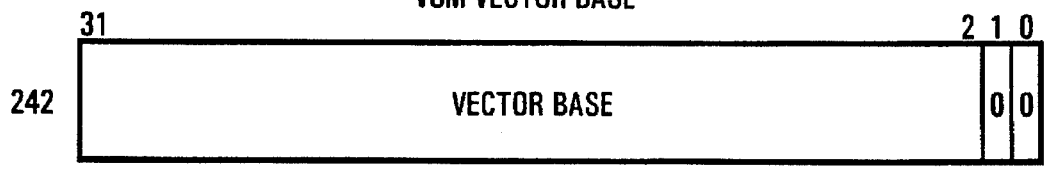
Figure 2G:
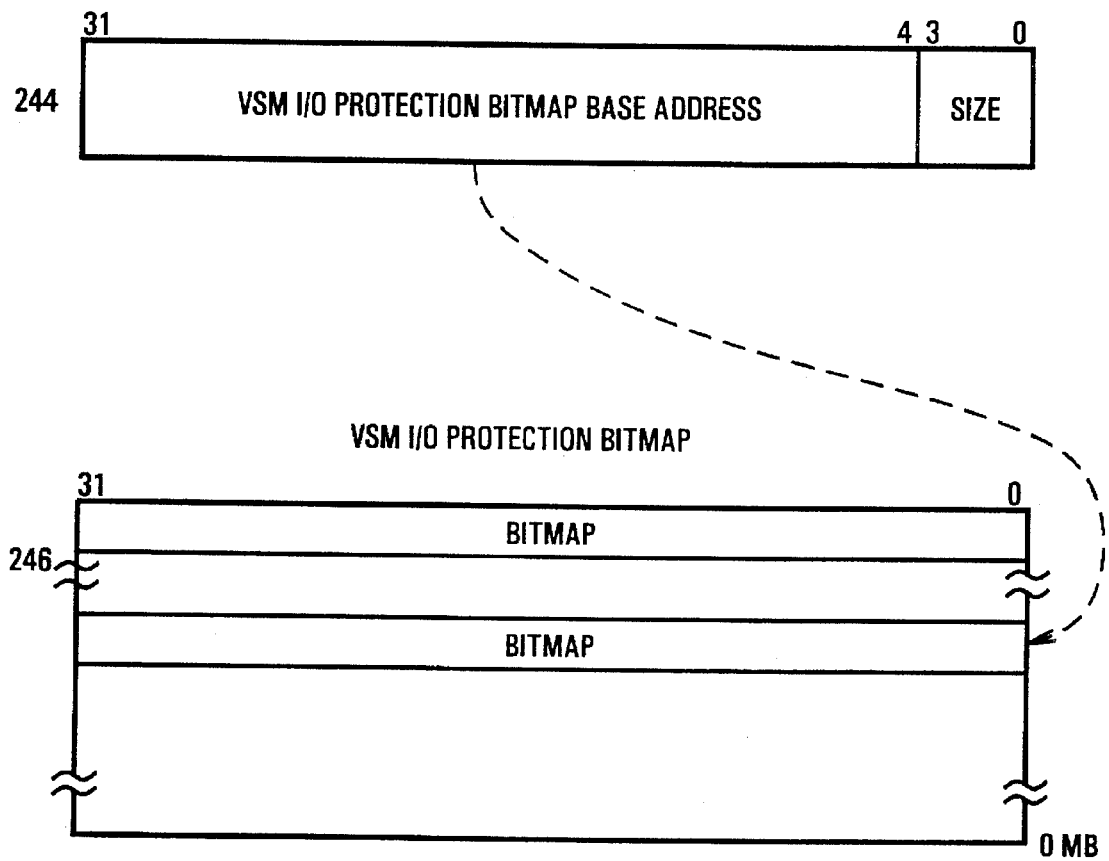
FIG. 2G illustrates the VSM I/O protection bitmap register and VSM I/O protection bitmap of the processor.

Referring now to FIGS. 2E–G, four VSM registers are shown. FIG. 2E illustrates the VSM enable register 238 for enabling most VSM functions. FIG. 2F illustrates the VSM stack register 240. FIG. 2G illustrates the VSM vector base register 242. FIG. 2G illustrates the VSM I/O protection bitmap register 244 and it's corresponding bitmap 246. The four VSM registers are used only during execution in virtual system mode and are not used by user mode tasks. These registers are accessible from any user mode until VSM is enabled. Turning now to FIG. 2E and Table 1 below, the format of the VSM Enable register 238 is defined.

TABLE 1

| Bits | Name | Description |
|---|---|---|
| 0 | VSME | VSM Enable. Setting this bit enables Virtual System Mode. This bit may only be set when the processor is executing in real mode or protected mode level 0. Once set, accesses to this or any other VSM register may only be made while the processor is executing in VSM. |
| 1 | LOE | Level 0 Enable. When this bit is set, all calls that target level 0 will cause a switch to VSM. When the RPL of the selector in the call gate is 0, VSM will be entered using the offset portion of the gate as the starting address in VSM logical space. If the gate specifies an argument value, the specified number of words are copied to the VSM stack. This bit should only be set when the OS is VSM aware. The call frame on the VSM stack is slightly different from the call frame for a level 0 call. Setting this bit also causes the processor to maintain the VSM stack in the TSS of a task. When LOE is set, the level 0 stack pointer in the TSS contains the base of the VSM stack. The level 0 TSS is not used. A task switch to a TSS with the VSM bit set in the saved EFLAGS image will cause the new task to be started in VSM. If LOE is not set, the VSM bit in the EFLAGS register is ignored on a task switch. |
| 2 | IOE | I/O Fault Enable. Setting this bit to 1 causes all I/O accesses by other than VSM code to be checked against the VSM I/O protection bitmap. If the I/O location is 'protected,' then accesses will cause a fault to VSM through the VSM I/O protection fault vector. When this bit is set and the processor is running in protected mode, the protected mode I/O protection bit map will be checked exceptions generated before the VSM I/O protection bitmap is checked. VSM I/O faults are generated after all other access checks have been completed. The normal protected mode I/O protection bitmap is checked and exceptions generated before any address checks. The VSM I/O |

TABLE 1-continued

| Bits | Name | Description |
|---|---|---|
| | | protection bitmap is checked last (after memory addresses have been validated). If SEE is set, this bit becomes redundant. |
| 3 | HIE | Hardware Interrupt Enable. Setting this bit to '1' causes all external hardware interrupt events (INTR and NMI) to be dispatched through the Hardware Interrupt Vector. |
| 4 | SEE | Software Exception Enable. Setting this bit to 1 causes all exception conditions generated by user mode software to be dispatched through the Software Interrupt Vector. When this bit is set, I/O protection faults generated from the I/O protection bitmap in the TSS will fault using the VSM semantics and through the VSM I/O protection fault vector. Also, the I/O protection bitmap in the TSS will be checked instead of the VSM I/O protection bitmap (after address checking). |
| 5 | DIE | Deferred Interrupt Enable. When this bit is set, a VSM Deferred Interrupt is generated when the IF bit is set by user code. This bit is used in combination with the Ignore IF bit to allow VSM to manage hardware interrupts regardless of the IF manipulations by other software. If a hardware event occurs that needs to be handled by non-VSM code, that code may have IF cleared, indicating that it is not capable of accepting a hardware interrupt at this time. If this occurs, the VSM hardware interrupt handler should set DIE so that VSM will regain control when the user code sets IF. The deferred interrupt may then be delivered. |
| 6 | IIF | Ignore Interrupt Flag. Setting this bit causes the processor to allow entry to VSM when any external hardware interrupt pin is active regardless of the setting of IF in EFLAGS. IF is not ignored in VSM. |
| 7 | VDB | VSM mode debug. Setting this bit enables the processor dependent debug exceptions when running in VSM |
| 8–31 | Reserved | Reserved for future use. |

FIG. 2F illustrates the VSM stack register 240 and VSM vector base register 242. The VSM stack register 240 is a 32-bit register indicating the starting logical address, or top, of the VSM stack. The VSM vector base register 242 is also a 32-bit register indicating the logical base address of the VSM interrupt vector table. These registers are both accessible from any user mode until VSM is enabled. In both registers, bits 0–1 are always "0" and writing a "1" is ignored and will not produce an exception.

Turning now to FIG. 2G, the VSM I/O protection bitmap register 244 and its corresponding VSM I/O protection bitmap 246 are illustrated. The 28-bit base address field defines the physical base address of a physically contiguous, 16-byte-aligned, VSM I/O protection bitmap 246. The size field is a 4-bit value that when raised to the power of two indicates the size, in bytes, of the bitmap. For example, a value of 0 indicates a single byte table, a value of 1 indicates a 2-byte table and a value of 12 indicates an 8-Kbyte table (64 kbits). Each bit of the bitmap specifies whether the byte-wide address associated with the bit can be accessed by a user mode operation. This bitmap is in addition to the I/O permission bitmap of the Intel 486 microprocessor. Thus, the normal I/O permission bitmap is checked, and exceptions generated before the VSM I/O protection bitmap is checked. When the VSME-bit is set, every I/O access is confirmed through the VSM I/O protection bitmap register. If access to that address is protected, then the user mode operation is vectored into a VSM handler.

MEMORY MANAGEMENT

Memory management in the processor P is performed by a segmentation unit and a paging unit. Segmentation is a mechanism for providing many independent address spaces. Paging is a mechanism to support a large physical address space in memory using a small amount of memory and some hard disk space. Addresses are generated differently depending upon the mode of operation.

The processor has three distinct address spaces known as logical, linear, and physical. An address issued by a program is a logical address and consists of a selector and an offset. Generally, the selector identifies a particular segment, and the offset identifies an address within the segment. Selector values are used by loading the value into the corresponding segment register discussed above. By using segments and offsets the processor can access a total of 64 Terabytes of logical address space in protected mode. The segmentation unit translates the logical address into an address for a continuous, unsegmented address space, called the linear address space. If the paging unit is enabled, the linear address is translated into the physical address, otherwise, the linear address corresponds to the physical address. The processor can access up to 4 Gigabytes of physical address space.

As stated, a logical address consists of a selector and an offset. One of the primary differences between real mode and protected mode is the way the segmentation unit translates the logical address into a linear address.

Figure 3A:
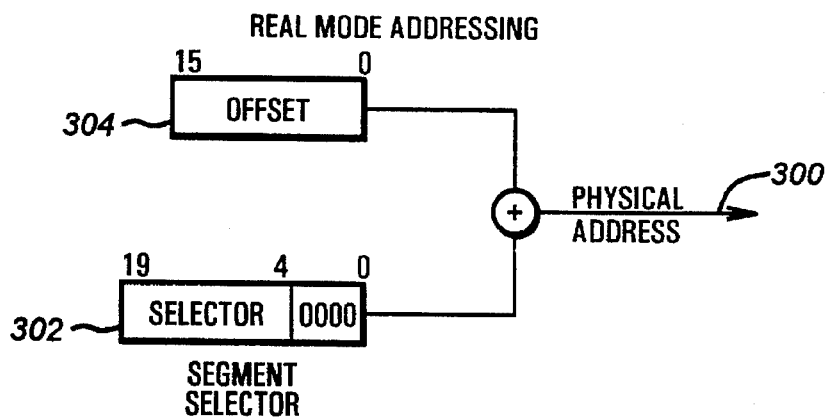
FIG. 3A illustrates the real mode addressing mechanism of the processor.

FIG. 3A illustrates the real mode addressing mechanism. In real mode, the segmentation unit shifts the 16-bit selector 302 left four bits and adds it to the 16-bit offset 304 to create a physical address 300. No paging is used and all tasks operate at the most privileged level. Virtual system mode addressing is similar, except that no segment values are used and the offset is 32-bit based, not 16-bit based as shown. Because no segment values are used, all offsets are zero-based. Therefore VSM addressing is a flat 32 bit model.

Figure 3B:
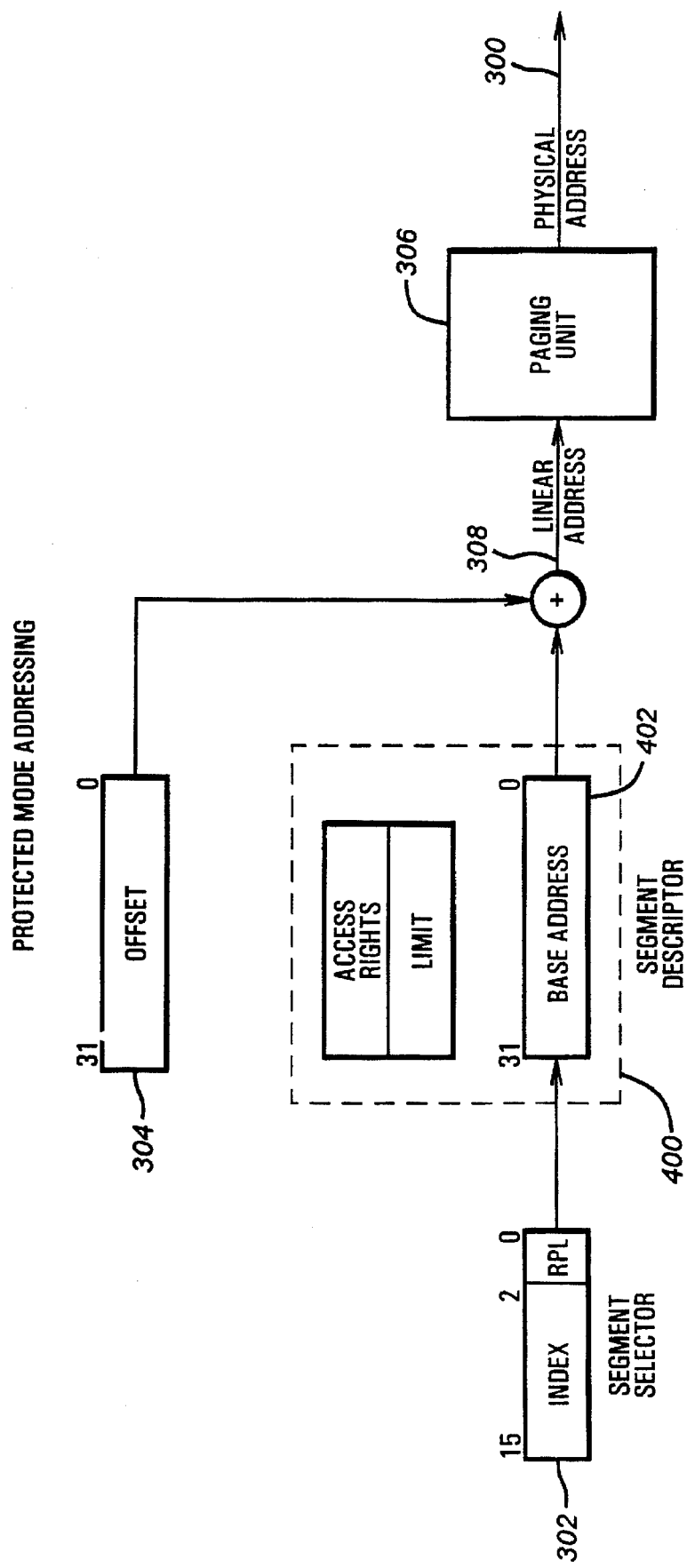
FIG. 3B illustrates the protected mode addressing mechanism of the processor.
Figure 4:
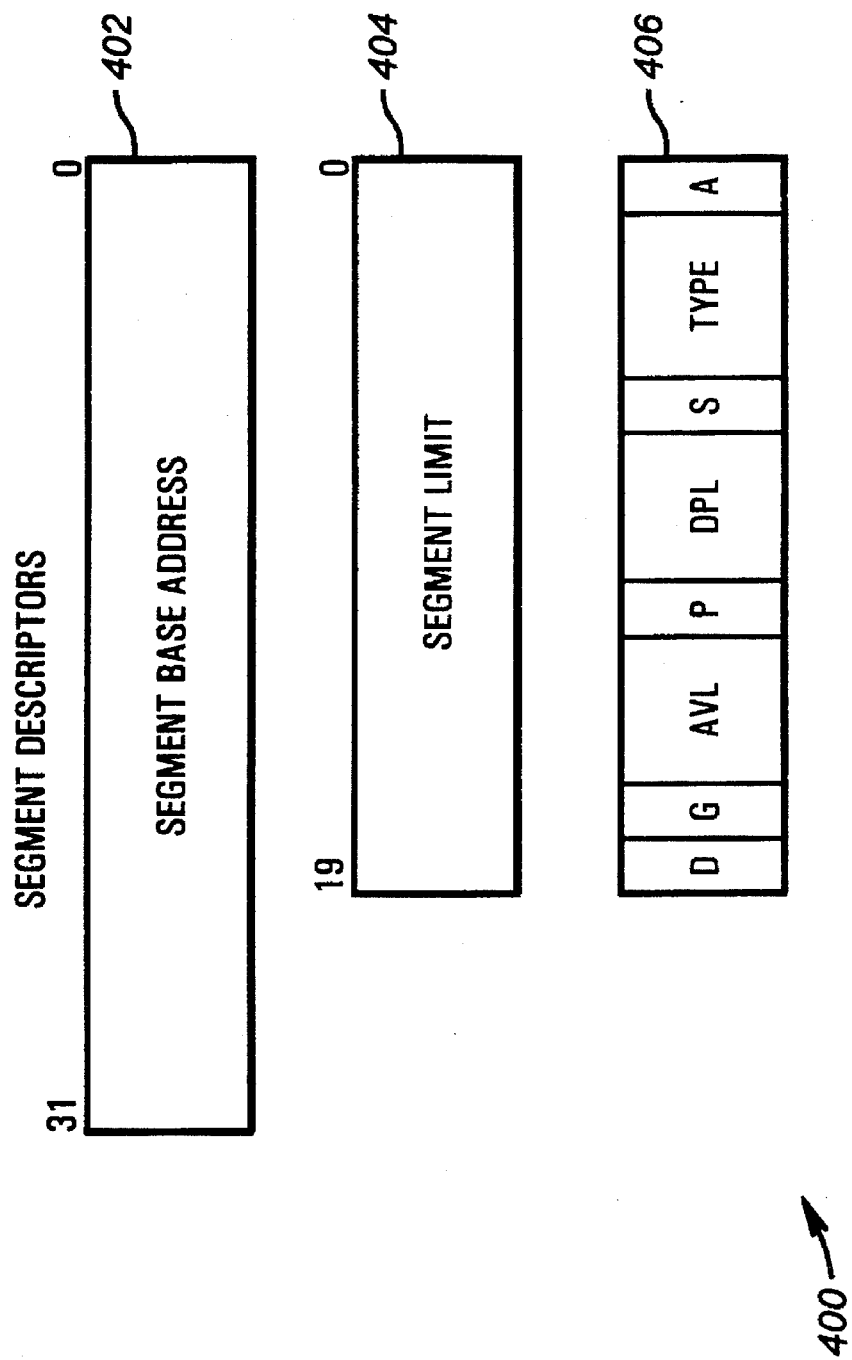
FIG. 4 illustrates a segment descriptor of the processor.

FIG. 3B illustrates the protected mode addressing mechanism. Also referring briefly to FIG. 4, in protected mode, the 16-bit selector 302 is used to specify an index to a segment descriptor 400 containing the 32-bit segment base address 602 which the segmentation unit then adds to a 32-bit offset 304 to create the linear address 308. Each selector has a corresponding segment descriptor 400 which is automatically loaded into a segment descriptor register when a selector value is loaded into a segment register. The two lower bits of the 16-bit selector 302, are termed the requestor privilege level bits (RPL) and define the privilege level of the original supplier of the selector. Privileges are discussed in more detail below.

In real mode, protected mode and virtual 8086 mode, there are two main types of non-system segments: code and data. Instructions do not explicitly need to specify which segment register is used to access a segment. In general, code references use the selector in the CS register, data references use the selector in the DS register, and stack references use the selector in the SS register, however, the defaults can be overridden. Special segment override prefixes allow a specific segment register to be used in place of the default segment registers. However, since the addressing mechanism for real mode and protected mode are incompatible, real mode selectors and offsets cannot be used when operating the processor P in protected mode, and similarly, protected mode selectors and offsets cannot be used when operating the processor P in real mode.

A similar problem is found in those processors having a system management mode. The addressing mechanism of the processor in system management mode, is incompatible with either real mode or protected mode, thus if using a processor with system management mode and emulation is desired, the user mode addresses must be translated into addresses compatible with the SMM addressing mechanism. This procedure is costly in terms of processing time.

When the processor P is operating in virtual system mode, the prior mode of the processor P (the mode of operation when the VSM event occurred), can be determined by the state of the PE-bit and the VM-bit. VSM can therefore be looked at as a submode of each of the user modes. When a segment register override is requested in VSM, the segment selector value is interpreted as being either a segment base address (real mode or virtual 8086 mode) or an index (protected mode) according to the context of the processor P as defined by the PE-bit and VM-bit. Thus, when in virtual system mode, the addressing mechanism of the previous mode of operation can be used for VSM operations, therefore making emulation much simpler.

Returning to FIG. 4, the segment descriptor register contains the segment descriptor 400 corresponding to the particular segment selector 302 loaded in a segment register (220–226). The segment descriptor 400 consists of a segment base address 402, a segment limit 404, and segment attribute and access right bits 406. The segment descriptor 400 contains two access bits, called DPL or descriptor privilege level bits, which define the least privileged level at which a task may access that descriptor, and an attribute bit termed the D-bit which indicates the default length for operands and offsets. If D=1 then 32-bit operands and 32-bit addressing modes are assumed. If D=0 then 16-bit operands and addressing modes are assumed. Regardless of the default precision of the operands or addresses, the processor is able to execute either 16-bit or 32-bit instructions by specifying an override prefix. The segment base address 402 defines the starting address of the segment. The segment limit 404 is combined with the granularity (G) bit to define a logical page size of 1 byte or 4kbytes with an offset limit of 1MB or 4 GB. The AVL, P, S, and A bits are used as in the 486 or Pentium and are described below.

Virtual System Mode Addressing

In virtual system mode, addresses are generated assuming 32-bit addressing without segmentation, and the flat memory model is employed, thus resulting in code, stack and data segments pointing to the same 4 GB address space. If a segment override is applied, then the address generation is performed using the specified segment register(s) with the contents of the segment register(s) interpreted as being either a segment value (real mode or virtual 8086 mode) or a selector (protected mode) according to the context of the processor prior to entering VSM as defined by the PE-bit and VM-bit, followed by paging checks if enabled, as similarly performed in user mode addressing. For example, if the processor was in real mode, PE=0 and VM=0, prior to entering VSM (i.e., a VSM event occurred while in real mode) and then if while in VSM a segment override is applied, the VSM addressing mechanism will interpret the address using the real mode addressing mechanism.

Figure 3C:
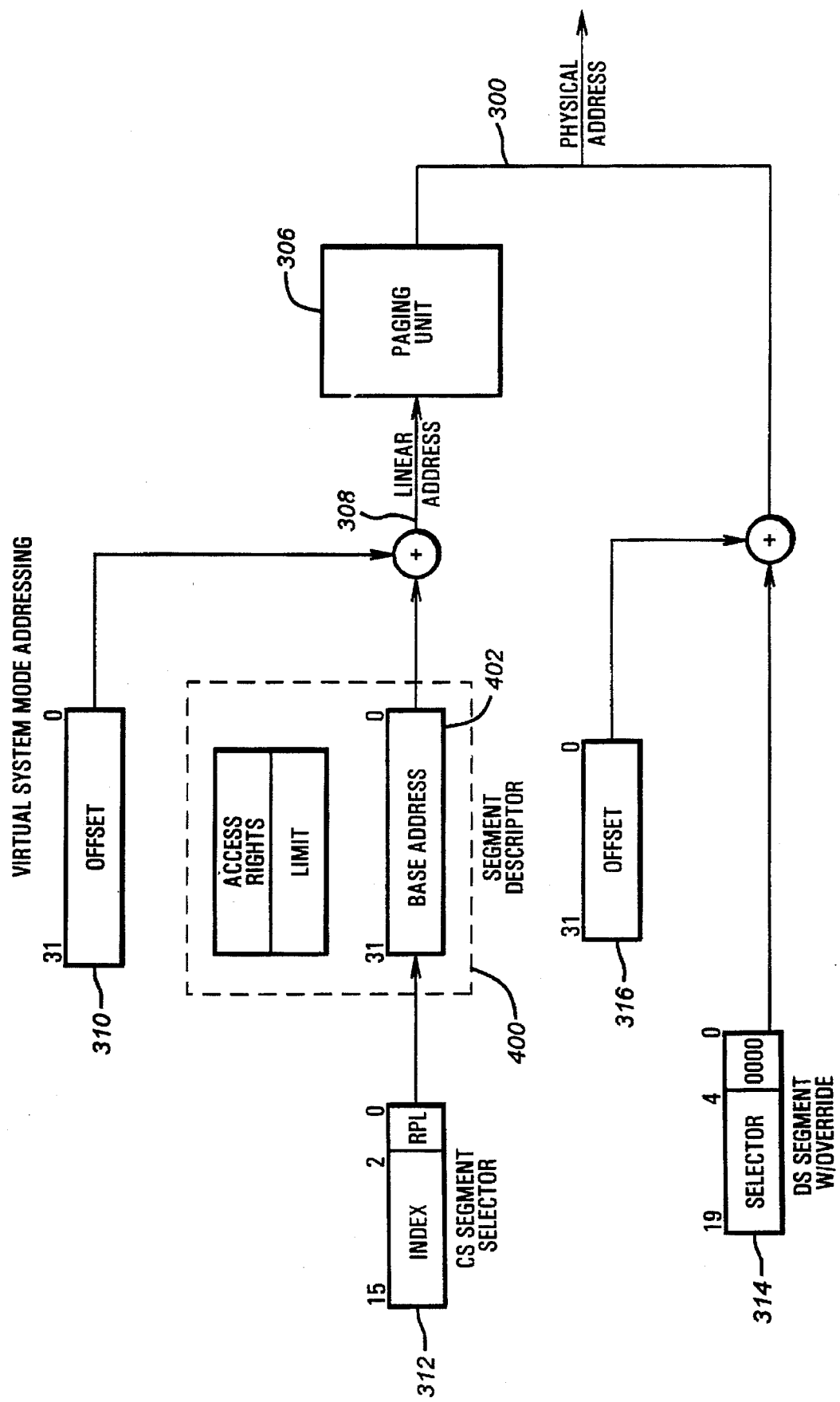
FIG. 3C illustrates an exemplary addressing situation for the VSM addressing mechanism of the processor.

FIG. 3C illustrates the exemplary addressing situation described above. The default mode, of an instruction is always 32-bits. Thus, the segment selector 312, here illustrated by the code segment, indexes to a base address 402 that is the combined with an offset 310 to produce the linear address 308. Normally the paging unit 306 is disabled in VSM and the linear address is also the physical address. In the flat memory model used by VSM the base address 402 is set to 0x00000000h and the offset produces the 32-bit address. If a segment override is applied, here represented as a data segment, the segment selector is interpreted according to the context of the processor prior to entering VSM—in this case real mode. Therefore the DS selector 314 is shifted left four bits and added to an offset 316 to produce a 20-bit real mode address. Protected mode addresses can be similarly generated but only if the processor P was in protected mode prior to entering VSM.

When a segment override prefix is present on an instruction, the address modulus of the operand is determined by the D-bit in the code segment descriptor. The D-bit in the code segment descriptor register represents the default addressing and data size for the user mode. For instructions which have two memory operands, the D bit only affects the address modulus of the operand associated with the segment override prefix. For example, if the D-bit is 0 and a move data from string to string instruction (MOVS) is executed, the source address will be ESI (a VSM memory source) and the destination address will be EDI (a VSM memory destination). If the same instruction is executed except a DS user mode segment override is applied, the source address will be DS:SI (a user mode source) and the destination will be EDI (a VSM memory destination). An instruction that uses ES as the default segment (i.e., no segment override allowed) may only have an address size prefix. An instruction that defaults to the DS segment and allows a segment override prefix, may use any segment as the override. Instructions that have two memory operands (e.g., MOVS, CMPS) may have two segment prefixes. For these instructions, if the ES override prefix is present, it will apply to the destination address only. Any segment overrides other than ES will apply to the source operand. ES may not be used twice to force its use for both source and destination. The foregoing discussion of VSM segment override prefixes is summarized in Table 2.

TABLE 2

| Segment Override Prefix | Address Size Prefix | D-bit | Address Modulus |
|---|---|---|---|
| No | X | X | 32 |
| Yes | No | 0 | 16 |
| Yes | No | 1 | 32 |
| Yes | Yes | 0 | 32 |
| Yes | Yes | 1 | 16 |

In virtual system mode, instructions such as Loop Control with CX Counter (LOOP) and Repeat Following String Operation (REP) which have an implied CX/ECX counter will use ECX unless an segment override and/or address prefix is present. If only an address prefix is present, then CX is used as the count register. If a segment override prefix is present, then the D-bit of the code segment descriptor will govern the choice along with an address prefix, if present.

Therefore, if a segment override prefix is present and, if the D-bit is 0 and no address prefix is present or if the D-bit is 1 and an address prefix is present then CX is used, otherwise ECX is used. The foregoing discussion of LOOP/REP Counter usage is summarized in Table 3.

TABLE 3

| Segment Override Prefix | Address Size Prefix | D-bit | Count Register Used |
|---|---|---|---|
| No | No | X | ECX |
| No | Yes | X | CX |
| Yes | No | 0 | CX |
| Yes | No | 1 | ECX |
| Yes | Yes | 0 | ECX |
| Yes | Yes | 1 | CX |

The processor P can support 8-bit, 16-bit and 32-bit data types. While in virtual system mode, the default data size is 32-bits, regardless of the D-bit, unless an instruction explicitly calls for a byte operand. Additionally, a operand-size prefix may be used to force a 16-bit operand. If a segment override prefix is present, the size of operands that are not explicitly byte operands are controlled by the D-bit in the code segment descriptor and an operand-size prefix. The foregoing discussion of VSM operand sizing is summarized in Table 4.

TABLE 4

| Segment Override Prefix | Operand Size Prefix | D-bit | Data Size |
|---|---|---|---|
| No | No | X | 32 |
| No | Yes | X | 16 |
| Yes | No | 0 | 16 |
| Yes | No | 1 | 32 |
| Yes | Yes | 0 | 32 |
| Yes | Yes | 1 | 16 |

If a segment override prefix is present on an instruction that has two memory operands, the size is determined by the combination of the D-bit in the code segment descriptor and the operand-size prefix and will apply to both operands. The combinations for an instruction having two memory operands and not explicitly a byte operand are listed in Table 5. Any segment register other than ES can be used as a segment override prefix to modify the source address. The destination operand address alone can be modified by using an ES prefix.

TABLE 5

| Segment Override Prefix | Operand Size Prefix | Address Size Prefix | D-bit | Data Size | Source | Dest'n | Count |
|---|---|---|---|---|---|---|---|
| None | No | No | X | 32 | ESI | EDI | ECX |
| None | No | Yes | X | 32 | ESI | EDI | CX |
| None | Yes | No | X | 16 | ESI | EDI | ECX |
| None | Yes | Yes | X | 16 | ESI | EDI | CX |
| DS | No | No | 0 | 16 | SI | EDI | CX |
| DS | No | No | 1 | 32 | ESI | EDI | ECX |
| DS | No | Yes | 0 | 16 | ESI | EDI | ECX |
| DS | No | Yes | 1 | 32 | SI | EDI | CX |
| DS | Yes | No | 0 | 32 | SI | EDI | CX |
| DS | Yes | No | 1 | 16 | ESI | EDI | ECX |
| DS | Yes | Yes | 0 | 32 | ESI | EDI | ECX |

TABLE 5-continued

| Segment Override Prefix | Operand Size Prefix | Address Size Prefix | D-bit | Data Size | Source | Dest'n | Count |
| --- | --- | --- | --- | --- | --- | --- | --- |
| DS | Yes | Yes | 1 | 16 | SI | EDI | CX |
| DS, ES | No | No | 0 | 16 | SI | DI | CX |
| DS, ES | No | No | 1 | 32 | ESI | EDI | ECX |
| DS, ES | No | Yes | 0 | 16 | ESI | EDI | ECX |
| DS, ES | No | Yes | 1 | 32 | SI | DI | CX |
| DS, ES | Yes | No | 0 | 32 | SI | DI | CX |
| DS, ES | Yes | No | 1 | 16 | ESI | EDI | ECX |
| DS, ES | Yes | Yes | 0 | 32 | ESI | EDI | ECX |
| DS, ES | Yes | Yes | 1 | 16 | SI | DI | CX |

While in virtual system mode, memory addressing to VSM memory may be paged or non-paged and is dependent on whether paging is enabled by the user mode operations. VSM code executes in a 32-bit logical space and VSM addresses are generated as 32-bit addresses by default. The upper 16-MByte of VSM memory (0xff000000 through 0xffffffff) is designated as non-mapped VSM memory. Logical addresses generated in this range are converted to an address that is in the upper 16-Mbyte of the physically addressable range of the processor P. VSM logical addresses generated below 0xff000000 are translated to physical addresses by the current page table if paging is enabled, otherwise these addresses become physical addresses without modification.

If a segment override is applied when addressing VSM memory, and the resulting logical address references memory at or above 0xff000000, the address is deemed not to reference non-mapped VSM memory and is translated into a physical address by the paging unit, if enabled. If no segment override prefix is used, the access is to VSM memory.

PROTECTION

The processor P has four levels of protection for supporting multi-tasking operating systems and to isolate and protect user programs from each other and the operating system. The privilege levels control the use of privileged instructions, I/O instructions, and access to segments and segment descriptors. Level 0 is the most privileged and level 3 is the least privileged. The current privilege level (CPL) specifies the task's privilege level which equals the privilege level of the code segment being executed. For virtual system mode addressing, CPL is level 0. While in VSM, for purposes of protection checking of user mode addresses, CPL is determined by the settings of the PE-bit, the VM-bit and the two low bits of the CS register. If PE=0, then CPL is assumed to be level 0. If PE=1 and VM=1, then CPL is assumed to be level 3. If PE=1 and VM=0, then the CPL is the low two bits of the CS segment register.

Segmentation provides another basis for protection. All of the descriptors in a system are contained in tables recognized by processor hardware. As described above, segment descriptors are 8-byte quantities which contain the attribute information about a given segment. These attributes include the access rights such as: protection level, read, write or execute privileges, the default size of the operands, and the type of segment. There are two main types of non-system segments: code segments and data segments (includes stacks). The segment (S) bit determines if a given segment is a system segment (S=0), or a code or data segment (S=1). Code and data segments have several descriptor fields in common. The accessed (A) bit is set whenever the processor accesses a descriptor. The executable (E) bit indicates if a segment is a code (E=1) or data segment (E=0).

In a data segment descriptor, the expansion direction (ED) bit specifies if a segment expands downward (ED=1, i.e., stack) or upward (ED=0, i.e., data). Data segments are readable and the write (W) bit controls the ability to write into a segment. Data segments are read-only if W=0.

A code segment may be designated execute-only or execute/read as determined by the read (R) bit. Code segments are execute only if R=0, and execute/read if R=1. Code segments may never be written to, however in virtual system mode, the DS segment register may be loaded with a code selector with no exception generated. Upon loading the DS register, the access rights for the segment will be forced to E=1 (code), ED=1 (expand down segment) and W=1 (read/write).

Protection checking is also automatically performed when a task switch is undertaken. Call gates are used to change privilege levels and are used to control access to entry points within the target code segment. Call gates are primarily used to transfer program control to a more privileged level. The call gate descriptor consists of three fields: the access byte, a selector and an offset which point to the start of a routine, and an argument count which specifies how many parameters are to be copied from the caller's stack to the stack of the called routine. The argument count field is only used on call gates when there is a change in the privilege level.

If the level 0 enable (LOE) is set in the VSM enable register 238, indirect calls through a call gate will enter virtual system mode if the requestor privilege level (RPL) of the gate's selector is 0. In this case the calling routine pushes ESP, EFLAGS and EIP onto the stack, and the gate's offset value is placed in EIP. If the gate indicates that an argument list is present, the specified number of words are transferred from the stack of the calling program into the VSM stack. When VSM is entered due to a level 0 call, the entry point for the routine cannot be the same as it is for VSM code calling the same routine. A VSM routine that is callable from privilege levels 1, 2 and 3 requires a stub routine. This stub routine may simply call the VSM routine, but when a return is made to the stub routine, it is responsible for adjusting the stack pointer (ESP) pushed on the stack so that the user stack will not pop the call values. The stub routine then executes an IRET that returns control to the outer level. If EFLAGS is used to convey the return conditions, the stub routine must also update the pushed EFLAGS values before returning.

I/O SPACE

The processor has two distinct physical address spaces, namely, memory and I/O space. The I/O space consists of 64 kbytes of physical address space. The processor includes a VSM I/O protection bitmap register 244, as shown in FIG. 2G. The VSM I/O protection bitmap register 244 contains a size field and an address field, as discussed above. While in virtual system mode and the hardware interrupt enable bit is set, the processor consults the VSM I/O protection bitmap 246 to determine if access to the I/O port is allowed, or a VSM interrupt to be generated instead. If the bit corresponding to an I/O address is set, then an access to that address will cause VSM to be entered through the VSM I/O protection fault vector for emulation. The VSM I/O protection bitmap address register 244 is only accessible in virtual system mode.

INTERRUPTS/EXCEPTIONS

Interrupts and exceptions alter the normal program flow in order to report errors or handle external events or exceptional conditions. All VSM events except a VSM Stack Fault are enabled in the VSM Enable register 238. If the VSM event is not enabled, then interrupt processing occurs through the conventional interrupt descriptor table. If the VSM event is enabled, for VSM events, interrupts and exceptions are handled through a VSM vector table. This vector table contains a single 32-bit value for each VSM event that points to the entry point for the VSM handler as defined in Table 6. The VSM vector table is located in VSM memory starting at the logical address contained in the VSM vector base register 242.

TABLE 6

| Vector | Offset | VSM Event |
| --- | --- | --- |
| 0 | 00h | VMI Instruction Trap |
| 1 | 04h | Deferred Interrupt Trap/Fault |
| 2 | 08h | VSM I/O Protection Fault |
| 3 | 0Ch | Hardware Interrupt |
| 4 | 10h | VSM Software Exception |
| 5 | 14h | VSM Stack Fault |
| 6 | 18h | RESERVED |
| 7 | 1Ch | RESERVED |

VSM interrupts and exceptions are referred to here as VSM events. When an VSM event occurs, the following actions happen. First, at a minimum, the current program address (EIP) and the flags register 100 (EFLAGS) are pushed on the stack to allow resumption of the interrupted program. If the processor is not in virtual system mode when the VSM event is generated, the current stack pointer (ESP) is pushed first before the current program address and flags register 100. Thus, the VSM-bit in the pushed EFLAGS value will indicate whether the stack pointer (ESP) was pushed on entry so that it can be restored on VSM exit. Next, an 8-bit vector is supplied to the processor which identifies the conventional entry in the user interrupt table. Interrupts have externally supplied vectors, while exceptions have internally supplied vectors. The processor then determines from the user vector which of the eight VSM vectors is applicable. The VSM vector table contains the starting address of the VSM interrupt service routine. Then the VSM interrupt service routine is executed. VSM code can then determine the source of the interrupt and respond appropriately, thus handling conventional interrupts conventionally or handling non-conventional interrupts with VSM emulation code. The VSM vectors are individually described below.

If enabled in the VSM enable register 238, a Virtual System Mode Interrupt (VMI) instruction will be trapped and the exception handled by VSM vector 0, thus immediately forcing the processor into virtual system mode. Traps are exceptions that are reported immediately after the execution of the instruction which caused the problem. Faults are exceptions that are detected and serviced before the execution of the faulting instruction.

If the Deferred Interrupt Fault/Trap (DIE) bit is set in the VSM Enable register 238, and a user mode program executes an instruction that sets the interrupt enable (IF-bit) in EFLAGS, a trap is taken through VSM vector 1. A deferred interrupt fault/trap is required when the following situation arises. When certain programs do not want to service interrupts, the interrupt enable (IF) bit in EFLAGS may be disabled. However, the ignore interrupt flag (IIF-bit) in the VSM Enable register 238 allows the processor to enter VSM when any external hardware interrupt is active regardless of the setting of the IF-bit. Therefore, a subsequent hardware interrupt will cause a VSM interrupt through VSM vector 3. If the VSM hardware interrupt handler determines that the interrupt needs to be handled by non-VSM handlers, the deferred interrupt enable (DIE) bit should be set so that the VSM deferred interrupt handler will regain control when the user code sets the IF-bit again and the deferred interrupt can then be delivered to the user code.

If the DIE-bit is cleared in the VSM enable register 238 but the emulator busy (EB) bit is set in EFLAGS and the user mode program executes an instruction that sets the IF-bit, but does not cause any other fault or trap, then a fault is taken through VSM vector 1. If the DIE-bit is set in the VSM enable register 238 and the emulator busy (EB) bit is set in EFLAGS and the user mode program executes an instruction that sets the IF-bit, then a fault is taken through VSM vector 1, but the IF-bit is left cleared.

If the I/O fault enable (IOE) bit in the VSM enable register 238 is set and an I/O access is made to a location that has the corresponding bit in the VSM I/O protection bitmap set to 1, then that I/O device requires a VSM handler, and the processor will enter virtual system mode and begin executing at the location pointed to by VSM vector 2. If the instruction causing the I/O access references more than one byte, any individual byte that has a corresponding bit in the VSM I/O protection bitmap 246 set will generate a I/O fault through this vector. When this fault is taken, the VSM stack will contain the following pushed register values, starting with the first pushed: ESP, EFLAGS, EIP, EAX, Next Instruction EIP, SEG REG and VFLAGS. Table 7 defines the stack values.

TABLE 7

| Stack Offset | Value |
| --- | --- |
| 18h | ESP (always) |
| 14h | EFLAGS |
| 10h | EIP |
| 0Ch | EAX |
| 08h | Next Instruction EIP |
| 04h | SEG REG |
| 00h | VFLAGS |

EAX contains the I/O address referenced by the instruction causing the fault. Next Instruction EIP contains the logical address of the instruction following the faulting instruction of the interrupted routine. If the VSM emulation is completed allowing execution to resume after the faulting instruction, the VSM handler will then move this value to the location of the saved EIP, thus effectively changing the fault into a trap. The SEG REG contains a copy of the segment register prefix specified in an OUTS instruction. Its contents are only defined for an OUTS instruction that has a segment prefix other than the DS segment. The pushed VFLAGS value is a 32-bit value having the definitions set forth in Table 8.

TABLE 8

| Bits | Name | Description |
| --- | --- | --- |
| 0 | I/O | This bit is set if the faulting instruction was an IN or INS. |
| 1 | STR | This bit is set if the faulting instruction was an INS or OUTS. |

TABLE 8-continued

| Bits | Name | Description |
| --- | --- | --- |
| 2 | REP | This bit is set if the faulting instruction was an INS or OUTS that had a REP prefix. |
| 3 | APB | This bit is set if the processor was operating in protected mode and no address size prefix was used on the faulting instruction or if the processor was in any other mode and an address size prefix was used on the faulting instruction. If the instruction was not an INS or OUTS, this bit is set to zero. |
| 4 | SEG REG | This bit is set if a segment override prefix other than DS was applied to an OUTS instruction. In all other cases, this bit will be 0. |
| 5–7 | RES | Reserved |
| 8 | DS0 | This bit is set if the data size of the operand is 32 or 16 bits. |
| 9 | DS1 | This bit is set if the data size of the operand is 32 bits. |
| 10–31 | RES | Reserved |

By providing all of this information in the stack, the VSM routine can readily determine the intended I/O operation which must be emulated. Then the use of a segment override allows the desired data to be obtained in the case of write emulation or placed in the case of read emulation without performing address translation. Thus, allowing two addressing modes to be active at one time, the short stack as compared to SMM and the detailed information provided, the I/O emulation can be rapid and efficient.

If the Hardware Interrupt Enable (HIE) bit in the VSM enable register 238 is set, all external hardware interrupts (INTR and NMI) will cause virtual system mode to be entered through vector 3. This vector allows conventional hardware to be transparently emulated with non-conventional hardware and a VSM handler.

If the Software Exception enable (SEE) bit in the VSM Enable register 238 is set, all software exceptions (including faults, traps, and aborts) and software interrupts (INT n instructions) are dispatched through VSM vector 4. This vector will also be used, regardless of the SEE setting, if while executing VSM code a software exception is generated. When this vector is entered, the VSM stack will contain the following pushed register values, starting with the first pushed: ESP (again, not present if exception generated by VSM code), EFLAGS, EIP, EAX, and CAUSE. Table 9 defines the stack.

TABLE 9

| Stack Offset | Value |
| --- | --- |
| 10h | ESP |
| 0Ch | EFLAGS |
| 08h | EIP |
| 04h | EAX |
| 00h | CAUSE |

EAX will contain the exception number as defined by the x86 architecture. If the trap was taken due to an INT n instruction, the exception number will be the interrupt number plus 256. A one byte interrupt, interrupt number 3 (INT), will have an exception number of 3. CAUSE will contain the condition code associated with the exception. If the exception type does not have an associated cause, the CAUSE value pushed onto the stack will be undefined. For a page fault, x86 architecture interrupt 14, the cause value is extended by one bit. Bit 3 will be cleared if the address causing the page fault had a segment override prefix in which case the access is to user memory space. If the address did not have an override prefix, then this bit is set to indicate that it was an access to VSM memory space.

The VSM stack fault vector is used when there is a page fault on the VSM stack. No values are pushed onto the VSM stack because the stack is in an undefined state. When the fault occurs, the Control Register 2 (CR2) will contain the logical address of the instruction causing the fault. The VSM flag is set in the EFLAGS register but the remainder of EFLAGS is unchanged, including the interrupt enable (IF) bit, although while in VSM the interrupts are disabled. If the VSM stack can be repaired, EFLAGS and the logical address of the instruction causing the fault can be pushed onto the VSM stack and the VSM handler can return to the faulting instruction with an IRET instruction. The IRET instruction will re-enable interrupts if the IF bit is set in the popped EFLAGS.

When VSM has completed processing the interrupting or excepting event, control can be passed back to the operating system through either an Interrupt Return (IRET), Reflect Exception with Condition Code (RECC) or Reflect Exception without Condition Code (RENCC) instruction.

For VSM purposes, the IRET instruction restores the EIP register and EFLAGS register. If a return is being made to non-VSM code, the ESP register is also restored. If a return is being made to VSM code, the VSM bit of the EFLAGS register will be set and the ESP register will not be popped.

The RECC instruction is used to transfer exception handling back to the operating system service routine from VSM code when there is a condition code associated with the exception causing the VSM event. This instruction is executed with EAX containing the user mode interrupt number, or exception number, that is to be reflected back to the OS. This value is used by the user mode operating system to index to the user mode interrupt vector for processing of the condition code. When this instruction is executed, the VSM stack is pushed according to Table 10.

TABLE 10

| Stack Offset | Value |
| --- | --- |
| 10h | ESP |
| 0Ch | EFLAGS |
| 08h | EIP |
| 04h | EAX |
| 00h | CAUSE |

The CAUSE value contains the condition code to be processed. EAX contains the user mode interrupt number, or exception number. When EFLAGS is moved from the VSM stack to the stack appropriate for the exception processing, the EB bit may be set. No further exception will be generated by the presence of the EB bit, but if set, EB will remain set when EFLAGS is written to the exception stack. These values are popped from the stack and located accordingly when the return occurs.

The RENCC instruction is used for hardware interrupts and exceptions that do not have a condition code or cause value. When this instruction is executed, the VSM stack is pushed according to Table 11. Operation is otherwise similar to the RECC instruction.

TABLE 11

| Stack Offset | Value |
| --- | --- |
| 10h | ESP |
| 0Ch | EFLAGS |
| 08h | EIP |
| 04h | EAX |

INSTRUCTION SET

In addition to instructions already defined by the x86 architecture, and the instructions previously discussed, a processor according to the present invention preferably would include the instructions set forth below to facilitate VSM operations.

A Move String with Variable Size (VMOVS) instruction copies the operand at (E)SI to the location at ES:(E)DI.

Format: VMOVS

The destination operand must be addressable from the ES segment and no segment override prefix is allowed. A segment override can be used for the source operand, but the default is the DS segment. After the data is moved, both the (E)SI and (E)DI registers are advanced automatically by a value contained in the AL register. The value loaded into AL prior to executing the VMOVS instruction specifies the size, in bytes, of the data being transferred with each iteration. The VMOVS instruction can be preceded by the Repeat (REP) instruction for block moves of (E)CX bytes. In this case, (E)CX will decrement by 1 on each iteration regardless of the value in AL.

A Jump (JMP) instruction transfers control to a different point in the instruction stream without recording return information. A Call (CALL) instruction causes the procedure named in the operand to be executed, and upon completion, execution continues at the instruction following the CALL instruction. Intersegment jumps and calls may be performed while executing user mode code. While executing in VSM, if an intersegment jump or call is specified, only the offset portion of the address is used. The segment value in the instruction is ignored.

A Translate (VTOP) instruction returns the physical address of the memory operand in EAX, and if necessary EDX.

Format: VTOP EAX, memory

VTOP returns the upper 32-bits of the physical address into EDX and the lower 32-bits of the physical address into EAX. If paging is not enabled, this instruction returns the linear address of the operand. If paging is enabled, the address is translated using the current page table. If there is no corresponding address because the logical address is out of range of the segment or if the page is not present, the Page Fault (PF) bit is set in EFLAGS. If the translation is successful, PF is cleared. If the processor has a physical addressing range greater than 4GByte, the Carry Flag (CF) will be set in EFLAGS. If the address is a VSM logical address (in VSM and no segment prefix on the operand), and the logical address is at or above 0xff000000, and the processor has physical addressing capabilities above 4GByte, then EDX will contain the most significant 32-bits necessary to cause the physical address to be in the upper 16 MByte of the processor's physical address range and CF will be set.

A Probe for Read Access (PROBER) instruction is used for testing a memory read operation for exceptions.

| Format: | PROBER | reg8, memory |
| --- | --- | --- |
| | | reg16, memory |
| | | reg32, memory |

The memory operand represents the location to be read into reg8/16/32, however, no data is actually returned and no exceptions are generated. If the read operation would have generated an exception (including page faults) had the read operation been performed, the Page Fault (PF) bit is set in EFLAGS. If the read operation would not have generated an exception, PF is cleared. Therefore, when operating in VSM, user mode memory may be checked for readability and if a page fault is anticipated by the PROBER instruction, VSM can call on the operating system to load the page into physical memory without requiring the page fault to actually occur. Executing this instruction on real mode memory will never result in a page fault, however, a test on virtual 8086 mode memory will only fail if paging is enabled (PE=1 and PG=1) and the page is not present or if the page is a supervisor page. No other bits in EFLAGS are modified as a result of this instruction.

A Probe for Write Access (PROBEW) instruction is used for testing a memory write operation for exceptions.

| Format: | PROBEW | memory, reg8 |
| --- | --- | --- |
| | | memory, reg16 |
| | | memory, reg32 |

The reg8/16/32 represents the value to be written into the location specified by memory value, however, no data is actually written and no exceptions are generated. If the write operation would have generated an exception (including page faults) had the write operation been performed, the Page Fault (PF) bit is set in EFLAGS. If the write operation would not have generated an exception, PF is cleared. Therefore, when operating in VSM, user mode memory may be checked for writeability and if a page fault is anticipated by the PROBER instruction, VSM can call on the operating system to load the page into physical memory. Executing this instruction on real mode memory will never result in a page fault, however, a test on virtual 8086 mode memory will only fail if paging is enabled (PE=1 and PG=1) and the page is not present or if the page is a supervisor page. No other bits in EFLAGS are modified as a result of this instruction.

A Default Address and Data Size (DADS) instruction returns a value indicating the default address and data size by examining the settings of the PE bit in CR0 and the D bit of the current code descriptor.

| Format: | DADS | reg8 |
| --- | --- | --- |
| | | reg16 |
| | | reg32 |

If PE is set and the D bit is set, then DADS returns a value of 2, otherwise a value of 1 is returned. If DADS is executed while in VSM without a segment prefix a value of 2 is returned.

A Test for Interrupt Pending (TIP) instruction sets the Parity Flag (PF) in EFLAGS if a hardware interrupt (INTR or NMI) is active. No other flags are altered. This allows VSM code to execute with interrupts disabled, because of the overhead of restarting an emulation sequence, but still periodically check interrupts.

As an additional change, while in VSM, for a Load Full Pointer (LDS, LES, LFS, LGS, or LSS) instruction, the offset values are always 32-bits unless a data size prefix is applied to the instruction.

The addition of these instructions further simplifies device emulation by providing the effective results of the user code intended operation without actually executing the user code instruction, incurring exception or fault overheads and then handling the problem. Further, the emulator code does not have to be incorporated into the conventional exception or fault handlers, but can remain separate, thus greatly simplifying the software requirements.

While the use of two different addressing modes concurrently has been described with regard to a new mode, it is understood that such capabilities could be provided to processors having just two or three conventional user modes. For example, if this dual concurrent addressing mode technique were used with a 486 or Pentium processor, transitions between real and protected mode code due to exceptions and faults would be simplified as the required reflections and address translations could be eliminated or greatly simplified.

It is noted that this description has used the phrase address mode to refer to the different addressing interpretations. It is not to be confused with the various addressing types, such as direct, indirect and indexed. The addressing types are available in each of the addressing modes and are independent of the addressing mode.

Thus a processor allowing is simplified use of non-standard devices by providing efficient and operating system independent emulation has been described.

The foregoing disclosure and description of the invention are illustrative and explanatory thereof, and various changes in the circuit elements as well as in the details of the illustrated circuitry and construction and method of operation may be made without departing from the spirit of the invention.

I claim:

1. A processor operable in a number of modes, comprising:
   a plurality of segment registers for specifying portions of an address;
   a first interpreter for interpreting values in said segment registers in a first mode to provide a linear address;
   a second interpreter for interpreting values in said segment registers in a second mode to provide a linear address; and
   a mode control circuit for allowing said first and second mode interpreters to operate concurrently on different of said segment registers.

2. The processor of claim 1, further comprising:
   a memory management unit receiving said linear address provided by said first and second mode interpreters and providing a physical address.

3. The processor of claim 2, further comprising:
   a third mode interpreter for interpreting values in said segment registers in a third mode to provide a linear address, and
   wherein said memory management unit receives said linear address provided by said third mode interpreter and provides a physical address, and wherein said mode control logic allows concurrent operation in said first mode and either of said second or third modes.

4. The processor of claim 3, further comprising:
   a fourth mode interpreter for interpreting values in said segment registers in a fourth mode to provide a linear address, and
   wherein said memory management unit receives said linear address provided by said fourth mode interpreter and provides a physical address, and wherein said mode control logic allows concurrent operation in said first mode and either of said second, third or fourth modes.

5. The processor of claim 4, wherein the processor is compatible with an Intel 386 processor.

6. The processor of claim 5, wherein said second, third and fourth modes are real, protected and virtual 8086 modes.

7. The processor of claim 2, wherein the processor further includes an instruction for translating a memory operand into a physical address and providing a lower portion of said physical address into a first register and an upper portion of said physical address into a second register.

8. The processor of claim 7, wherein said memory management unit further includes a selectably enabled paging unit and wherein if paging is enabled said memory operand is translated into a physical address and if paging is not enabled said memory operand is translated into a linear address.

9. The processor claim 2, wherein said memory management unit further includes a selectably enabled paging unit and wherein said first mode causes said memory management unit to provide said linear address as said physical address if said linear address is in a reserved range.

10. The processor of claim 9, wherein if said linear address is not in said reserved range then said first mode causes said memory management unit to either translate said linear address to said physical address by said paging unit if paging is enabled or provide said linear address as said physical address if paging is disabled.

11. The processor of claim 9, wherein a segment override can be applied to the segment registers, and wherein if said segment override causes said linear address to be in said reserved range, then said first mode causes said memory management unit to either translate said linear address to said physical address by said paging unit if paging is enabled or provide said linear address as said physical address if paging is disabled.

12. The processor of claim 2, further comprising:
   a code segment register for receiving a code segment selector for addressing a code segment containing instruction sequences; and
   a data segment register for receiving a data segment selector for addressing a data segment containing data; and
   wherein if the processor is in said first mode, an exception is not generated when said code segment selector is loaded into said data segment register.

13. The processor of claim 12, wherein said code segment is write protected and said data segment is readable and writable and wherein if the processor is in said first mode, said code segment is writable when said code segment selector is loaded into said data segment register.

14. The processor of claim 1, wherein entry into said first mode is performed under one of a plurality of conditions and wherein the processor further includes a stack for receiving values upon entry into said first mode, said stack values including a program address and flags.

15. The processor of claim 14, wherein the processor further includes an input/output space and further comprising:
   an input/output protection bitmap, each bit in said bitmap indicating entry or non-entry into said first mode from said second mode if an access is made to an input/output address corresponding to said bit.

16. The processor of claim 15, wherein said stack values further include a current instruction address, next instruction address and bits for indicating instruction type, operand data size and prefix presence of an instruction causing the entry into said first mode.

17. The processor of claim 14, wherein entry into said first mode is caused on receipt of a hardware interrupt.

18. The processor of claim 17, wherein said stack values further include a stack pointer.

19. The processor of claim 17, wherein the processor further includes the ability to ignore hardware interrupts in said second mode and wherein a first bit may be set to indicate entry into said first mode even if said second mode is set to ignore hardware interrupts.

20. The processor of claim 19, wherein if said first bit is set and said second mode is operational and ignoring hardware interrupts and a hardware interrupt occurs causing entry into said first mode, a second bit is set and said hardware interrupt is not responded to so that upon return to said second mode and when said second mode is no longer ignoring hardware interrupts, entry into said first mode occurs to handle said hardware interrupt.

21. The processor of claim 20, wherein if the processor is operating in said first mode and one of said plurality of conditions causes reentry into said first mode a third bit is set, wherein said first mode reentry is further caused if said third bit is set and if an instruction is executed causing the hardware interrupts to be ignored in said second mode.

22. The processor of claim 14, wherein entry into said first mode is caused by any software exception including faults, traps, aborts and software interrupts.

23. The processor of claim 22, wherein said stack values further include an exception type and condition code of said condition causing said entry into said first mode and a stack pointer.

24. The processor of claim 14, wherein entry into said first mode is caused if a page fault to said stack occurs.

25. The processor of claim 24, further comprising:
a control register; and
wherein said control register receives a logical address of an instruction causing said page fault.

26. The processor of claim 14, wherein entry into said first mode is caused by executing a special instruction for immediately forcing the processor into said first mode.

27. The processor of claim 26, wherein said stack values further include a stack pointer.

28. The processor of claim 1, wherein exit from said first mode is caused by executing one of a plurality of instructions.

29. The processor of claim 28, wherein the processor further includes an interrupt return instruction for exiting from said first mode after an interrupt.

30. The processor of claim 29, wherein said interrupt return instruction causes a program address and flags to be provided to the processor from said stack.

31. The processor of claim 30, wherein if said interrupt return instruction causes the processor to return to said first mode, a bit is set and if said interrupt return instruction causes the processor to return to said second mode, a stack pointer is provided to the processor from said stack.

32. The processor of claim 28, wherein the processor further includes a reflect exception instruction for passing exception handling to said second mode from said first mode and for exiting said first mode to said second mode.

33. The processor of claim 32, wherein said reflect exception instruction causes an exception number, program address, flags and stack pointer to be provided to the processor from said stack.

34. The processor of claim 28, wherein the processor further includes a reflect exception with condition code instruction for passing a condition code to said second mode from said first mode and for exiting said first mode after an exception having a condition code has occurred.

35. The processor of claim 34, wherein said reflect exception with condition code instruction causes a condition code, exception number, program address, flags and stack pointer to be provided to the processor from said stack.

36. The processor of claim 1, wherein the processor further includes an instruction for moving a string of variable size, said instruction having a source operand for indicating a source address, a destination operand for indicating a destination address, and a size operand for indicating a number of bytes to be moved from said source address to said destination address in the move operation.

37. The processor of claim 36, wherein said instruction for moving a string of variable size may be repeated for the number of operations in a count register, said source address and said destination address incrementing by said size operand value in each move operation and said count register being decremented by one in each move operation.

38. The processor of claim 1, wherein the processor further includes an instruction for probing a memory location for access exceptions and setting a bit if an exception would have been generated had said access occurred.

39. The processor of claim 1, wherein the processor further includes an instruction for determining a default address and data size.

40. The processor of claim 1, wherein the processor further includes an instruction for testing for presence or non-presence of an interrupt when the processor is set to ignore interrupts.

41. The processor of claim 1, wherein said first mode operations have a default data and address size of 32-bit.

42. The processor of claim 1, wherein the processor further includes a plurality of instructions having two memory operands, said memory operands each being capable of being overridden with a different segment register by a segment override, and wherein said plurality of instructions cause said mode control logic to operate when the processor is operating in said first mode and one of said memory operands are overridden with a segment override, whereby one said memory operand can be interpreted according to said first mode interpreter and a second said memory operand can be interpreted according to said second mode interpreter.

43. The processor of claim 1, wherein the processor further includes a plurality of instructions for performing operations in said first and second modes, said instructions having operands for performing the instruction, wherein in said first mode if a segment override is applied to said instruction or said instruction operand said values in said segment registers are interpreted according to said second mode interpreter.

44. A computer system having a processor for emulating input/output devices, the computer system comprising:
a host bus;
an I/O bus;
a bus controller for communicating between said host bus and said I/O bus;
a hard disk system coupled to said I/O bus; and
a processor coupled to said host bus for accessing said a hard disk system, said processor comprising:
a plurality of segment registers for specifying portions of an address;

a first mode interpreter for interpreting values in said segment registers in a first mode of said processor to provide a linear address;

a second mode interpreter for interpreting values in said segment registers in a second mode of said processor to provide a linear address; and mode control logic for allowing said first and second mode interpreters to operate concurrently on different of said segment registers.

45. The computer system of claim 44, wherein said processor further comprises:

a memory management unit receiving said linear address provided by said first and second mode interpreters and providing a physical address.

46. The computer system of claim 45, wherein said processor further comprises:

a third interpreter for interpreting values in said segment registers in a third mode to provide a linear address, and wherein said memory management unit receives said linear address provided by said third mode interpreter and provides a physical address, and wherein said mode control logic allows concurrent operation in said first mode and either of said second or third modes.

47. The computer system of claim 46, wherein said processor further comprises:

interpreter for interpreting values in said segment registers in a fourth mode to provide a linear address, and wherein said memory management unit receives said linear address provided by said fourth mode interpreter and provides a physical address, and wherein said mode control logic allows concurrent operation in said first mode and either of said second, third or fourth modes.

48. The computer system of claim 47, wherein said processor is compatible with an Intel 386 processor.

49. The computer system of claim 48, wherein said second, third and fourth modes are real, protected and virtual 8086 modes.

50. The computer system of claim 45, wherein said processor further includes an instruction for translating a memory operand into a physical address and providing a lower portion of said physical address into a first register and an upper portion of said physical address into a second register.

51. The computer system of claim 50, wherein said memory management unit further includes a selectably enabled paging unit and wherein if paging is enabled said memory operand is translated into a physical address and if paging is not enabled said memory operand is translated into a linear address.

52. The computer system claim 45, wherein said memory management unit further includes a selectably enabled paging unit and wherein said first mode causes said memory management unit to provide said linear address as said physical address if said linear address is in a reserved range.

53. The computer system of claim 52, wherein if said linear address is not in said reserved range then said first mode causes said memory management unit to either translate said linear address to said physical address by said paging unit if paging is enabled or provide said linear address as said physical address if paging is disabled.

54. The computer system of claim 52, wherein a segment override can be applied to the segment registers, and wherein if said segment override causes said linear address to be in said reserved range, then said first mode causes said memory management unit to either translate said linear address to said physical address by said paging unit if paging is enabled or provide said linear address as said physical address if paging is disabled.

55. The computer system of claim 45, wherein said processor further comprises:

a code segment register for receiving a code segment selector for addressing a code segment containing instruction sequences; and a data segment register for receiving a data segment selector for addressing a data segment containing data; and wherein if said processor is in said first mode, an exception is not generated when said code segment selector is loaded into said data segment register.

56. The computer system of claim 55, wherein said code segment is write protected and said data segment is readable and writable and wherein if said processor is in said first mode, said code segment is writable when said code segment selector is loaded into said data segment register.

57. The computer system of claim 44, wherein entry into said first mode is performed under one of a plurality of conditions and wherein said computer system further comprises:

an input/output device coupled to said I/O bus; and a memory unit, coupled to said host bus, for storing data including instruction sequences and a stack;

wherein said stack receives values upon entry into said first mode, said stack values including a program address and flags.

58. The computer system of claim 57, wherein said processor further includes an input/output space and said computer system further comprises:

an input/output protection bitmap, stored in said memory unit, each bit in said bitmap indicating entry or nonentry into said first mode from said second mode if an access is made to an input/output device having an input/output address corresponding to said bit, said bit indicating entry if access is made to an input/output device requiring emulation, said bit indicating nonentry if an access is made to an input/output device not requiring emulation.

59. The computer system of claim 58, wherein said stack values further include a current instruction address, next instruction address and bits for indicating instruction type, operand data size and prefix presence of an instruction causing the entry into said first mode.

60. The computer system of claim 57, wherein said input/output device is capable of providing a hardware interrupt and entry into said first mode is caused on receipt of a hardware interrupt.

61. The computer system of claim 60, wherein said stack values further include a stack pointer.

62. The computer system of claim 60, wherein said processor further includes the ability to ignore hardware interrupts in said second mode and wherein a first bit may be set to indicate entry into said first mode even if said second mode is set to ignore hardware interrupts.

63. The computer system of claim 62, wherein if said first bit is set and said second mode is operational and ignoring hardware interrupts and a hardware interrupt occurs causing entry into said first mode, a second bit is set and said hardware interrupt is not responded to so that upon return to said second mode and when said second mode is no longer ignoring hardware interrupts, entry into said first mode occurs to handle said hardware interrupt.

64. The computer system of claim 63, wherein if said processor is operating in said first mode and one of said plurality of conditions causes reentry into said first mode a third bit is set, wherein said first mode reentry is further caused if said third bit is set and if an instruction is executed causing the hardware interrupts to be ignored in said second mode.

65. The computer system of claim 57, wherein entry into said first mode is caused by any software exception including faults, traps, aborts and software interrupts.

66. The computer system of claim 65, wherein said stack values further include an exception type and condition code of said condition causing said entry into said first mode and a stack pointer.

67. The computer system of claim 57, wherein entry into said first mode is caused if a page fault to said stack occurs.

68. The computer system of claim 67, wherein said processor further comprises:

a control register; and wherein said control register receives a logical address of an instruction causing said page fault.

69. The computer system of claim 57, wherein entry into said first mode is caused when said processor executes a special instruction for immediately forcing said processor into said first mode.

70. The computer system of claim 69, wherein said stack values further include a stack pointer.

71. The computer system of claim 44, wherein exit from said first mode is caused by executing one of a plurality of instructions.

72. The computer system of claim 71, wherein said processor further includes an interrupt return instruction for exiting from said first mode after an interrupt.

73. The computer system of claim 72, wherein said interrupt return instruction causes a program address and flags to be provided to said processor from said stack.

74. The computer system of claim 73, wherein if said interrupt return instruction causes said processor to return to said first mode, a bit is set in said processor and if said interrupt return instruction causes the processor to return to said second mode, a stack pointer is provided to said processor from said stack.

75. The computer system of claim 71, wherein said processor further includes a reflect exception instruction for passing exception handling to said second mode from said first mode and for exiting said first mode to said second mode.

76. The computer system of claim 75, wherein said reflect exception instruction causes an exception number, program address, flags and stack pointer to be provided to said processor from said stack.

77. The computer system of claim 71, wherein said processor further includes a reflect exception with condition code instruction for passing a condition code to said second mode from said first mode and for exiting said first mode after an exception having a condition code has occurred.

78. The computer system of claim 77, wherein said reflect exception with condition code instruction causes a condition code, exception number, program address, flags and stack pointer to be provided to said processor from said stack.

79. The computer system of claim 44, wherein said processor further includes an instruction for moving a string of variable size, said instruction having a source operand for indicating a source address, a destination operand for indicating a destination address, and a size operand for indicating a number of bytes to be moved from said source address to said destination address in the move operation.

80. The computer system of claim 79, wherein said instruction for moving a string of variable size may be repeated for the number of operations in a count register, said source address and said destination address incrementing by said size operand value in each move operation and said count register being decremented by one in each move operation.

81. The computer system of claim 44, wherein said processor further includes an instruction for probing a memory location for access exceptions and setting a bit if an exception would have been generated had said access occurred.

82. The computer system of claim 44, wherein said processor further includes an instruction for determining a default address and data size.

83. The computer system of claim 44, wherein said processor further includes an instruction for testing for presence or non-presence of an interrupt when said processor is set to ignore interrupts.

84. The computer system of claim 44, wherein said first mode operations have a default data and address size of 32-bit.

85. The computer system of claim 44, wherein said processor further includes a plurality of instructions having two memory operands, said memory operands each being capable of being overridden with a different segment register by a segment override, and wherein said plurality of instructions cause said mode control logic to operate when said processor is operating in said first mode and one of said memory operands are overridden with a segment override, whereby one said memory operand can be interpreted according to said first mode interpreter and a second said memory operand can be interpreted according to said second mode interpreter.

86. The computer system of claim 44, wherein said processor further includes a plurality of instructions for performing operations in said first and second modes, said instructions having operands for performing the instruction, wherein in said first mode if a segment override is applied to said instruction or said instruction operand said values in said segment registers are interpreted according to said second mode interpreter.

* * * * *